US011606711B2

(12) United States Patent
Sasame (10) Patent No.: US 11,606,711 B2
(45) Date of Patent: Mar. 14, 2023

(54) COMMUNICATION APPARATUS, COMMUNICATION SYSTEM, COMMUNICATION METHOD, AND COMMUNICATION PROGRAM

(71) Applicant: NEC Corporation, Tokyo (JP)

(72) Inventor: Toshiaki Sasame, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 17/318,205

(22) Filed: May 12, 2021

(65) Prior Publication Data

US 2021/0360467 A1   Nov. 18, 2021

(30) Foreign Application Priority Data

May 14, 2020   (JP) .............................. JP2020-084873

(51) Int. Cl.
*H04W 28/02*   (2009.01)
*H04W 28/08*   (2009.01)

(52) U.S. Cl.
CPC ............... *H04W 28/0263* (2013.01); *H04W 28/0231* (2013.01); *H04W 28/0247* (2013.01); *H04W 28/0815* (2020.05)

(58) Field of Classification Search
CPC ......... H04W 28/0263; H04W 28/0231; H04W 28/0247; H04W 28/0815; H04W 40/22
See application file for complete search history.

(56) References Cited

U.S. PATENT DOCUMENTS

| 2010/0329379 A1* | 12/2010 | Pham ................... H04L 27/2647 375/267 |
| 2015/0031284 A1* | 1/2015 | Pitakdumrongkija ...................... H04W 24/02 455/9 |
| 2017/0026862 A1* | 1/2017 | Li .......................... H04W 24/08 |

FOREIGN PATENT DOCUMENTS

JP   2006313992 A   11/2006

OTHER PUBLICATIONS

Rec. ITU-R P.838-3, "Specific Attenuation model for rain for use in prediction methods", year 2005, p. p.8 (Year: 2005).*
NEC Corporation, White Paper, "NEC Multiband Radio Solution", pp. 1-7, [online], [retrieved on Apr. 30, 2020], Internet, <https://www.nec.com/en/global/prod/nw/pasolink/doc/NEC_Multiband_Radio_Solution_WP_20190222.pdf>.

* cited by examiner

*Primary Examiner* — Jung H Park (57) ABSTRACT

A terminal device includes an estimation unit and a distribution unit. The estimation unit estimates the radio transmission capacity of a second radio transmission path on the basis of a reception level of a radio signal from each of a first radio transmission path and the second radio transmission path. The second transmission path includes at least one radio repeater and is divided into two with the radio repeater disposed in between so that one side thereof towards the communication apparatus serves as a first radio section and the other side thereof opposite to the one side serves as a second radio section. The distribution unit distributes the data input thereto to the first radio transmission path and to the second radio transmission path on the basis of the radio transmission capacity of the first radio transmission path and the estimated radio transmission capacity of the second radio transmission path.

7 Claims, 7 Drawing Sheets

| DIFFERENCE | RAINFALL INTENSITY |
|---|---|
| EQUAL TO OR LOWER THAN 5dB | A |
| EQUAL TO OR HIGHER THAN 5dB AND EQUAL TO OR LOWER THAN 10dB | B |
| * * * * * | * * * * * |
| * * * * * | * * * * * |
| * * * * * | * * * * * |
| * * * * * | * * * * * |
| * * * * * | * * * * * |

Fig. 6

| BANDWIDTH OF FIRST RADIO TRANSMISSION PATH | FIRST RAINFALL INTENSITY | ESTIMATED BANDWIDTH OF SECOND RADIO TRANSMISSION PATH |
|---|---|---|
| 100 | A | 100 |
| 100 | B | 70 |
| * * * * * | * * * * * | * * * * * |
| * * * * * | * * * * * | * * * * * |
| * * * * * | * * * * * | * * * * * |
| * * * * * | * * * * * | * * * * * |
| * * * * * | * * * * * | * * * * * |

COMMUNICATION APPARATUS, COMMUNICATION SYSTEM, COMMUNICATION METHOD, AND COMMUNICATION PROGRAM

INCORPORATION BY REFERENCE

This application is based upon and claims the benefit of priority from Japanese patent application No. 2020-084873, filed on May 14, 2020, the disclosure of which is incorporated herein in its entirety by reference.

TECHNICAL FIELD

The present disclosure relates to a communication apparatus, a communication system, a communication method, and a communication program.

BACKGROUND ART

In a radio communication system, there are cases where a technology of Link Aggregation (link aggregation technology) is employed in order to broaden the transmission capacity among the radio communication apparatuses. The link aggregation technology is a technology that virtually bundles a plurality of physical lines into one, thus making it possible to use a bandwidth equivalent to the sum of the bandwidths of the physical lines.

In addition, as shown in Non-Patent Literature 1 (NEC MULTIBAND RADIO SOLUTION [online], [retrieved on Apr. 30, 2020], Internet, <https://www.nec.com/en/global/prod/nw/pasolink/doc/NEC_Multiband_Radio_Solution_WP_20190222.pdf>), a system of link aggregation of the Multi Band in a communication path using different radio frequencies is also considered.

Patent Literature 1 (Japanese Unexamined Patent Application Publication No. 2006-313992) discloses a fixed radio access network system in which a transmission path between two fixed base stations for signal transmission is configured of a plurality of radio frequency channels by different relay paths, and in which each of the fixed base stations is provided with a means for detecting the line status of the radio frequency channels by analyzing received signals and distributing transmission data to each radio link based on the channel status.

In Patent Literature 1, in the case of analyzing the transmission quality of a channel assumed to be used, the status of the transmission quality of a link due to rain attenuation and interference is analyzed by adding a frame check sequence to a signal frame to be transmitted and received and detecting a frame error on the receiving side based on the frame check sequence.

In the multi-band link aggregation in which different frequency bands are combined, when the radio transmission path is a path in which a plurality of radio repeaters are connected in series, the radio transmission path of the frame is maintained even if a bandwidth reduction occurs due to the influence of weather or the like in a certain radio section as long as a failure does not occur in the physical port in the network device. Therefore, when congestion occurs on the radio transmission path and the buffer memory is exhausted, there is a possibility that a frame loss of the main signal occurs.

SUMMARY

In view of the above-described problems, it is an object of the present disclosure to provide a communication apparatus, a communication system, a communication method, and a communication program capable of appropriately distributing input data to each radio transmission path when a bandwidth reduction occurs in a radio transmission path.

A communication apparatus according to an aspect of the present disclosure includes:

an estimation unit configured to estimate a radio transmission capacity of a second radio transmission path on the basis of a reception level of a radio signal from each of a first transmission path and the second transmission path, the first radio transmission path being connected to the communication apparatus and the second transmission path being connected to the communication apparatus, including at least one radio repeater, and being divided into two with the radio repeater disposed in between so that one side thereof towards the communication apparatus serves as a first radio section and the other side thereof opposite to the one side serves as a second radio section; and a distribution unit configured to distribute data input thereto to the first radio transmission path and to the second radio transmission path on the basis of the radio transmission capacity of the first radio transmission path and the estimated radio transmission capacity of the second radio transmission path.

A communication system according to another aspect of the present disclosure includes:

a communication apparatus;

a first radio transmission path connected to the communication apparatus;

a second radio transmission path connected to the communication apparatus, including at least one radio repeater, and divided into two with the radio repeater disposed in between so that one side thereof towards the communication apparatus serves as a first radio section and the other side thereof opposite to the one side serves as a second radio section;

an estimation unit configured to estimate a radio transmission capacity of the second radio transmission path on the basis of a reception level of a radio signal from each of the first radio transmission path and the second radio transmission path received by the communication apparatus; and a distribution unit configured to distribute data input thereto to the first radio transmission path and to the second radio transmission path on the basis of the radio transmission capacity of the first radio transmission path and the estimated radio transmission capacity of the second radio transmission path.

A communication method according to an aspect includes:

estimating a radio transmission capacity of a second radio transmission path on the basis of a reception level of a radio signal from each of a first transmission path and the second transmission path, the first radio transmission path being connected to a communication apparatus and the second transmission path being connected to the communication apparatus, including at least one radio repeater, and being divided into two with the radio repeater disposed in between so that one side thereof towards the communication apparatus serves as a first radio section and the other side thereof opposite to the one side serves as a second radio section; and distributing input data to the first radio transmission path and to the second radio transmission path on the basis of the radio transmission capacity of the first radio transmission path and the estimated radio transmission capacity of the second radio transmission path.

A program according to an aspect of the present disclosure causes a computer to perform the processes of:

estimating a radio transmission capacity of a second radio transmission path on the basis of a reception level of a radio signal from each of a first transmission path and the second transmission path, the first radio transmission path being connected to a communication apparatus and the second transmission path being connected to the communication apparatus, including at least one radio repeater, and being divided into two with the radio repeater disposed in between so that one side thereof towards the communication apparatus serves as a first radio section and the other side thereof opposite to the one side serves as a second radio section; and distributing input data to the first radio transmission path and to the second radio transmission path on the basis of the radio transmission capacity of the first radio transmission path and the estimated radio transmission capacity of the second radio transmission path.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Hereinbelow, the example embodiments of the present disclosure will be described with reference to the drawings. The following description and attached drawings are shortened and simplified where appropriate to clarify the explanation.

The present example embodiment relates to a technique of effectively utilizing a bandwidth by using a plurality of radio transmission paths having different propagation characteristics in order to expand a transmission a capacity, and distributing a flow in accordance with the bandwidth of each radio transmission path. When a radio transmission path is configured of a plurality of radio repeaters, the bandwidth of the radio communication is prone to vary due to the influence of the weather or the like, and thus the route control in accordance with the change in the bandwidth is particularly important.

Figure 1:
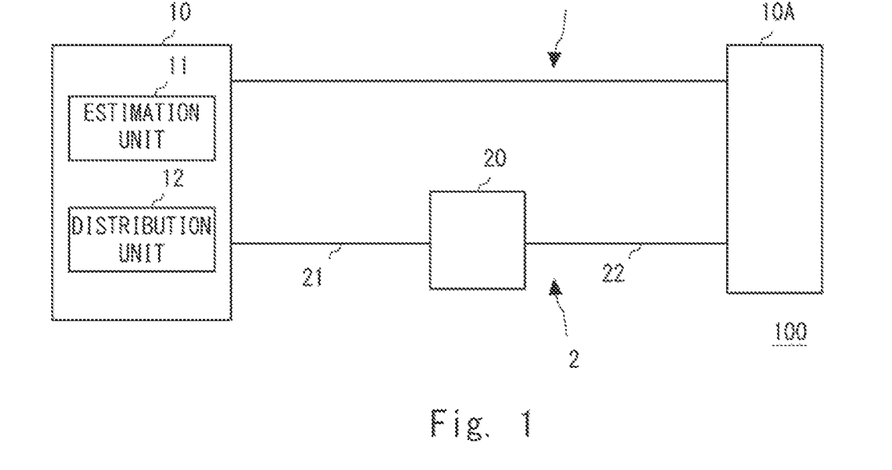
FIG. 1 is a block diagram showing a configuration of a terminal device according to an example embodiment.

FIG. 1 is a block diagram showing a configuration of a terminal device 10, which is a communication apparatus according to the example embodiment. The terminal device 10 includes an estimation unit 11 and a distribution unit 12. The estimation unit 11 estimates the radio transmission capacity of a second radio transmission path 2 on the basis of a reception level of a radio signal from each of a first radio transmission path 1 and the second radio transmission path 2. The second transmission path 2 includes at least one radio repeater 20 and is divided into two with the radio repeater disposed in between so that one side thereof towards the terminal device serves as a first radio section 21 and the other side thereof opposite to the one side serves as a second radio section 22. The distribution unit 12 distributes the data input thereto to the first radio transmission path 1 and to the second radio transmission path 2 on the basis of the radio transmission capacity of the first radio transmission path 1 and the estimated radio transmission capacity of the second radio transmission path 2.

As described above, according to the example embodiment, it is possible to estimate the radio transmission capacity of each transmission path only from the information that can be acquired from the terminal device 10 on the transmission side without having to add or collect new information, and the input data can be properly distributed to each transmission path. Accordingly, it is possible to suppress unnecessary frame loss. Hereinbelow, a specific example embodiment will be described.

Figure 2:
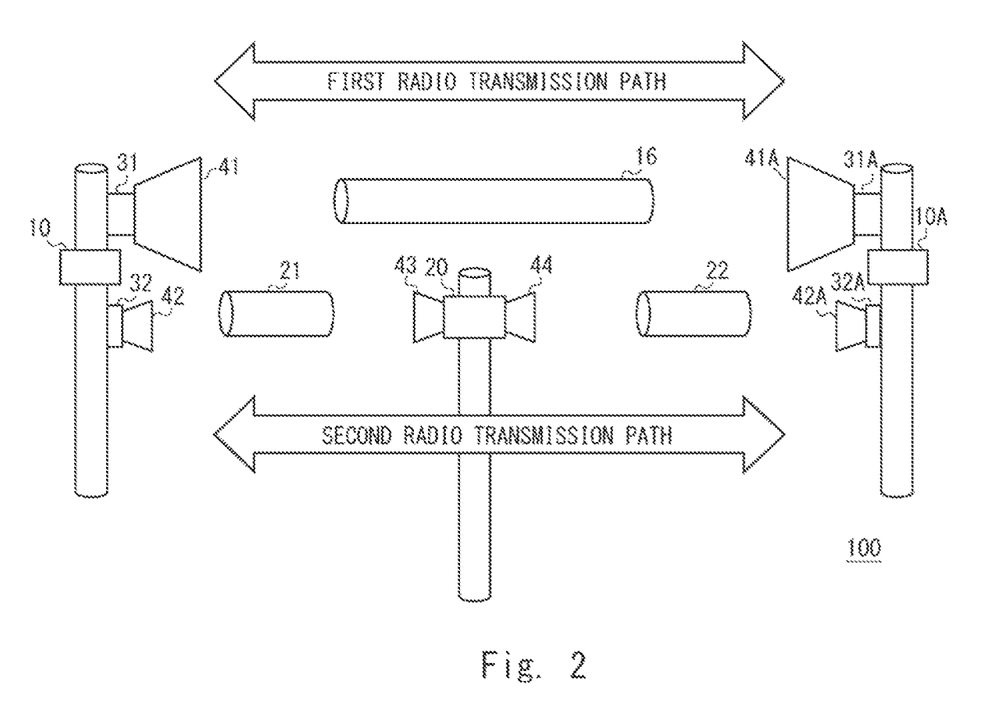
FIG. 2 is a diagram showing a configuration of a communication system according to an example embodiment.

FIG. 2 is a block diagram showing a configuration of a communication system 100 according to the example embodiment. As shown in FIG. 2, the communication system 100 includes terminal devices 10 and 10A, a radio repeater 20, radio signal processing devices 31, 31A, 32, and 32A, and antennas 41, 41A, 42, 42A, 43, and 44. In the example shown in FIG. 2, the terminal device 10 and the terminal device 10A are disposed so as to face each other via the first radio transmission path 1 and the second radio transmission path 2. The communication system 100 according to the example embodiment is capable of performing two-way communication, and each device has both a transmitting function and a receiving function described below. Hereinafter, the terminal device 10 will be described as the transmitting side and the terminal device 10A will be described as the receiving side.

An antenna 41 and an antenna 41A are connected with each other by a radio path 16. The antenna 42 and the antenna 43 are connected with each other by the first radio section 21, and the antenna 44 and the antenna 42A are connected with each other by the second radio section 22. The first radio transmission path 1 is a path extending from the radio signal processing device 31 through the antenna 41, the radio path 16, and the antenna 41A to the radio signal processing unit 31A.

Further, the second radio transmission path 2 is a path extending from the radio signal processing device 32 through the antenna 42, the first radio section 21, the radio repeater 20, the second radio section 22, and the antenna 42A to the radio signal processing unit 32A. That is, the second radio transmission path 2 includes at least one radio repeater 20 and is divided into two with the radio repeater 20 disposed in between so that one side thereof towards the terminal device 10 serves as the first radio section 21 and the other side thereof opposite to the one side serves as the second radio section 22.

Both the first radio transmission path 1 and the second radio transmission path 2 transmit radio waves having a frequency of millimeter waves or higher. The second radio transmission path 2 uses a radio frequency difference from that of the first radio transmission path 1. It is assumed that transmission through each of the first radio transmission path 1 and the second radio transmission path 2 is performed under a state in which there is hardly any difference in the amount of rainfall. The propagation loss of the frequency is large in the second radio transmission path 2 that has the radio repeater 20 disposed at some midpoint thereof compared to the propagation loss of the frequency in the first radio transmission path 1.

Since there is no repeater disposed at some midpoint of the first radio transmission path 1, the radio signal processing device 31 is able to grasp the radio transmission capacity of the transmission and the reception performed in the first radio transmission path 1. However, since there is a repeater disposed at some midpoint of the second radio transmission path 2, radio signal processing device 32 is unable to grasp the radio transmission capacity of transmission performed in the second radio section 22 even though it is possible to grasp the transmission capacity of transmission performed in the first radio section 21. As described above, if the transmission capacity of the entire radio transmission path cannot be grasped, loss of data packets may occur when there is a reduction in the bandwidth.

Therefore, in the example embodiment, the terminal device 10 estimates the radio transmission capacity of the entire second radio transmission path 2 that includes a plurality of radio sections in accordance with only the information available from the transmission side without having to add or collect new information. A method for estimating the radio transmission capacity will be described later.

Figure 3:
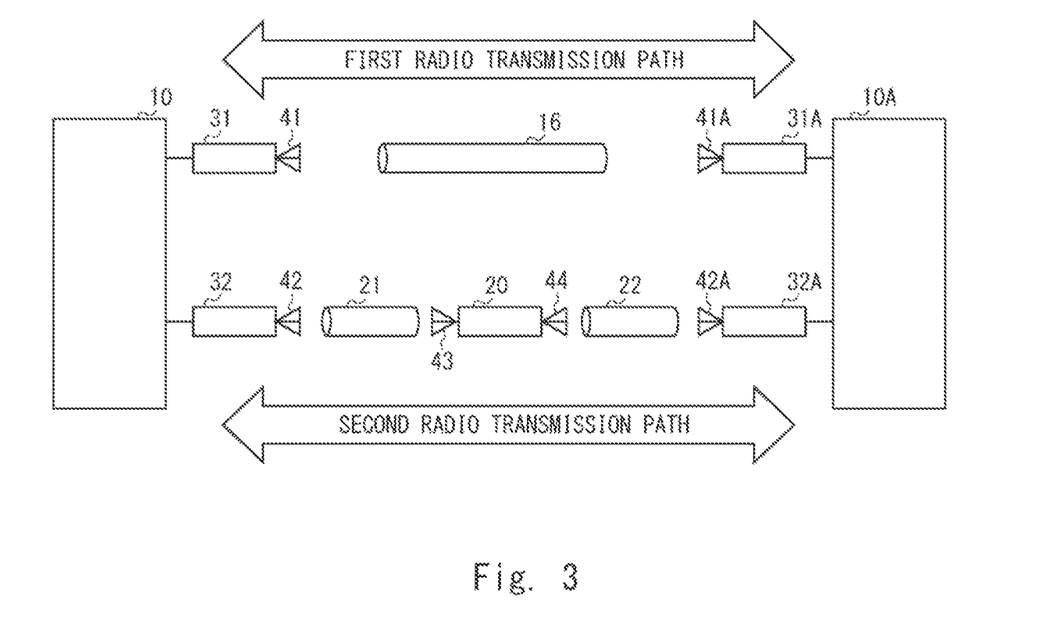
FIG. 3 is a block diagram illustrating connections of constituent components of the communication system according to an example embodiment.

FIG. 3 is a block diagram illustrating connections of constituent components of the communication system 100 shown in FIG. 2. The data input from the terminal device 10 is divided in the terminal device 10 and then appropriately distributed to each radio transmission path as appropriate. A method of distributing data will be described later. The data distributed to the first radio transmission path 1 by the terminal device 10 is input to the radio signal processing device 31, modulated to a radio signal, and then transmitted from the antenna 41. The radio signal thus transmitted passes through the radio path 16 and is received by the antenna 41A. The radio signal processing device 31A demodulates the received radio signal and inputs the demodulated radio signal to the terminal device 10A.

The data distributed from the terminal device 10 to the second radio transmission path 2 is modulated to a radio signal by the radio signal processing device 32 and then is transmitted from the antenna 42, passes through the first radio section 21 and is received by the antenna 43. The radio repeater 20 appropriately amplifies the radio signal received by the antenna 43 and re-transmits the amplified radio signal by the antenna 44. The transmitted radio signal passes through the second radio section 22 and is received by the antenna 42A, and then it is demodulated by the radio signal processing device 32A. The radio signal processing unit 32A inputs the demodulated data to the terminal device 10A. The terminal device 10A assembles the input signal into the original data and outputs the assembled data.

Here, a method of estimating the radio transmission capacity in accordance with the difference in the propagation characteristics of the respective frequencies of the radio waves will be described.

The free-space loss $L_f$ of the radio waves can be obtained by the following Expression 1.

$$L_f = \frac{P_t}{P_r} = \left(\frac{4\pi d}{\lambda}\right)^2 \quad \text{[Expression 1]}$$

Here, $\pi$ denotes pi, d denotes a distance between antennas, and $\lambda$ denotes a wavelength of the radio waves. In addition to the free space shown in the above expression, there are losses due to absorption of water vapor and oxygen in the radio wave loss, but a reference reception level (a reference reception power) of the radio wave at the time of normal operation can be calculated depending on the frequency to be used, the area at which the apparatus is to be installed, and the distance between the antennas.

Figure 8:
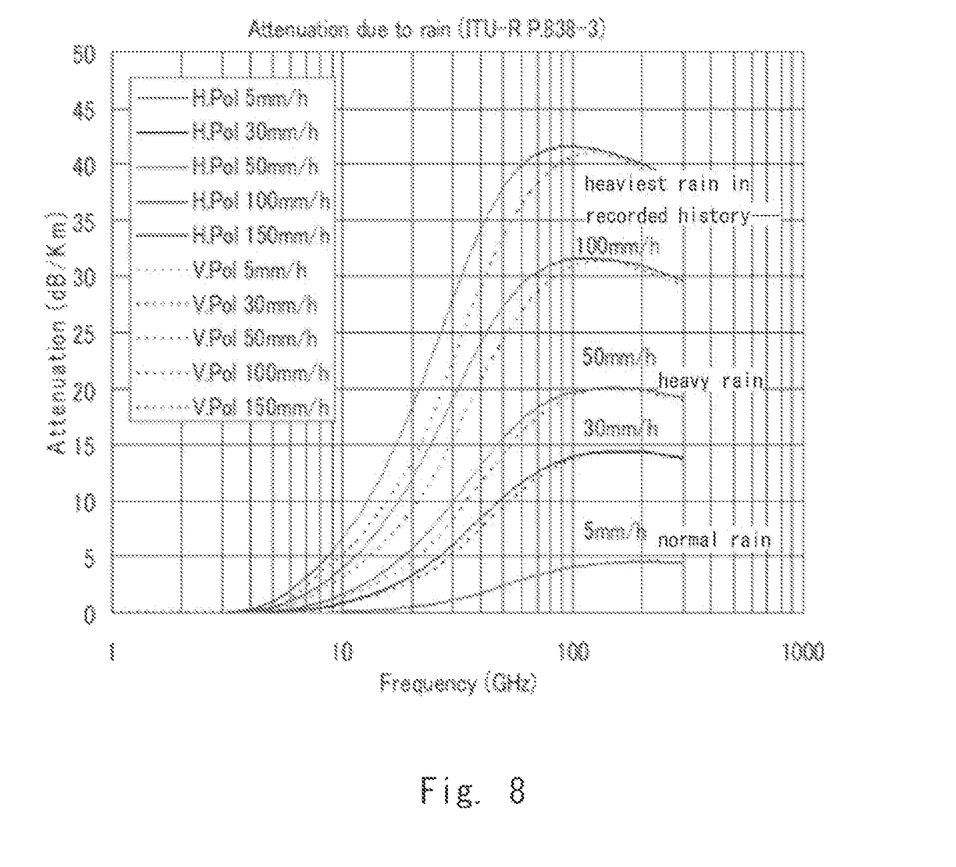
FIG. 8 is a graph showing an attenuation due to rain described in the recommendation ITU-R P838-3.

FIG. 8 shows the attenuation of the radio waves due to the intensity of rain described in the recommendation ITU-R P.838-3. From FIG. 8, it can be understood that the attenuation of the radio waves due to rain varies depending on the rainfall intensity, and that if the rainfall intensity can be estimated, the attenuation of each frequency can be estimated. In general, in a frequency band of millimeter waves or more in which frequency selective fading is less likely to occur, flat fading becomes the main fading, and the radio transmission capacity (the bandwidth information) of the radio transmission path can be estimated from the reception level.

Figure 4:
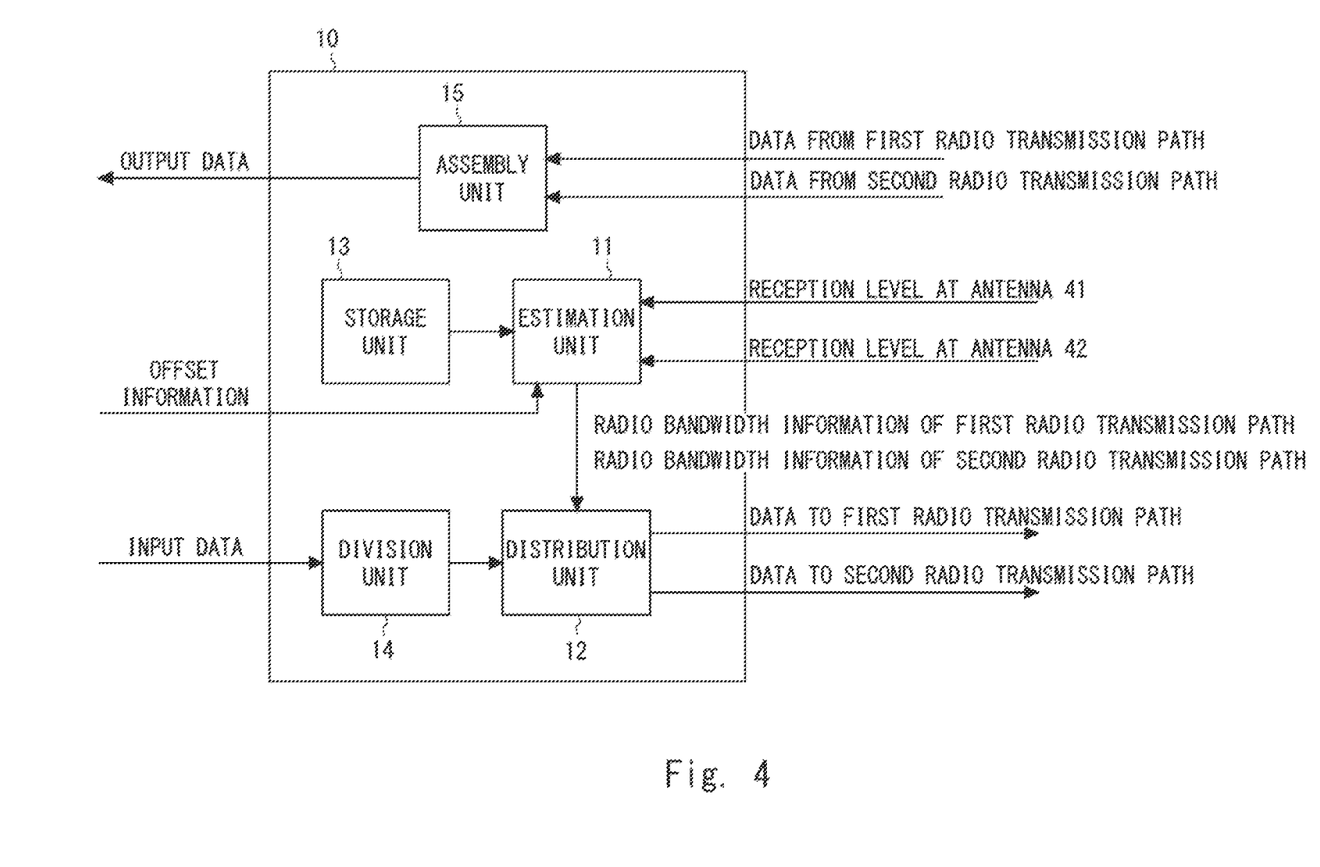
FIG. 4 is a block diagram showing a configuration of the terminal device shown in FIG. 3.

In the example embodiment, the terminal device 10 estimates the radio transmission capacity of the entire second radio transmission path 2. FIG. 4 is a block diagram showing a configuration of the terminal device 10 shown in FIG. 3. The terminal device 10 includes, in addition to the estimation unit 11 and the distribution unit 12 described with reference to FIG. 1, a storage unit 13, a division unit 14, and an assembly unit 15. Note that the terminal device 10A may also have the same configuration as that of the terminal device 10.

The estimation unit 11 estimates the radio transmission capacity of the second radio transmission path 2 on the basis of the reception level of the radio signal from each of the antenna 41 and the antenna 42. Each reception level in fine weather is calculated from the distance between the antennas at the time of installation thereof and stored as a known reference value (a reference reception level) in the storage unit 13. Specifically, the estimation unit 11 compares the reference reception level with the reception level, calculates a difference between the reference reception level and the reception level as an attenuation, and estimates the rainfall intensity using the attenuation, thereby estimating the radio transmission capacity of the second radio transmission path 2.

The division unit 14 divides the input data into lengths that can be efficiently radio transmitted. The distribution unit 12 distributes the divided input data to the first radio transmission path 1 and the second radio transmission path 2 in accordance with the radio transmission capacity of the first radio transmission path 1 and the estimated radio transmission capacity of the second radio transmission path 2. The assembling unit 15 assembles the data input from the first radio transmission path 1 and the second radio transmission path 2 into the original data and outputs the assembled data.

Figure 5:
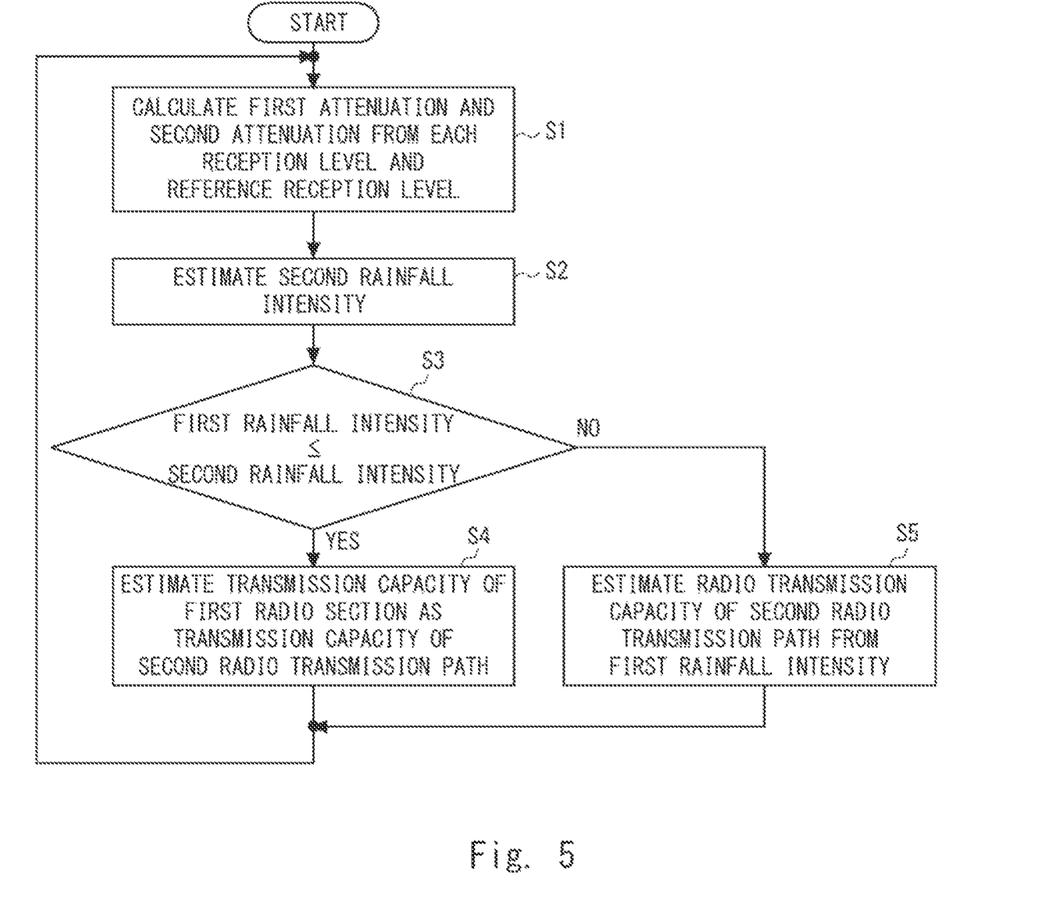
FIG. 5 is a flowchart illustrating an operation of the estimation unit shown in FIG. 4.

The operation of the estimation unit 11 that estimates the radio transmission capacity (the bandwidth information) of the second radio transmission path 2 will be described with reference to FIG. 5. First, the estimation unit 11 acquires the reception level of the radio signal at each of the antenna 41 and the antenna 42, and compares them with the respective reference reception levels stored in the storage unit 13 to calculate a first attenuation of the radio path 16 and a second attenuation of the first radio section 21 (Step S1).

Figure 6:
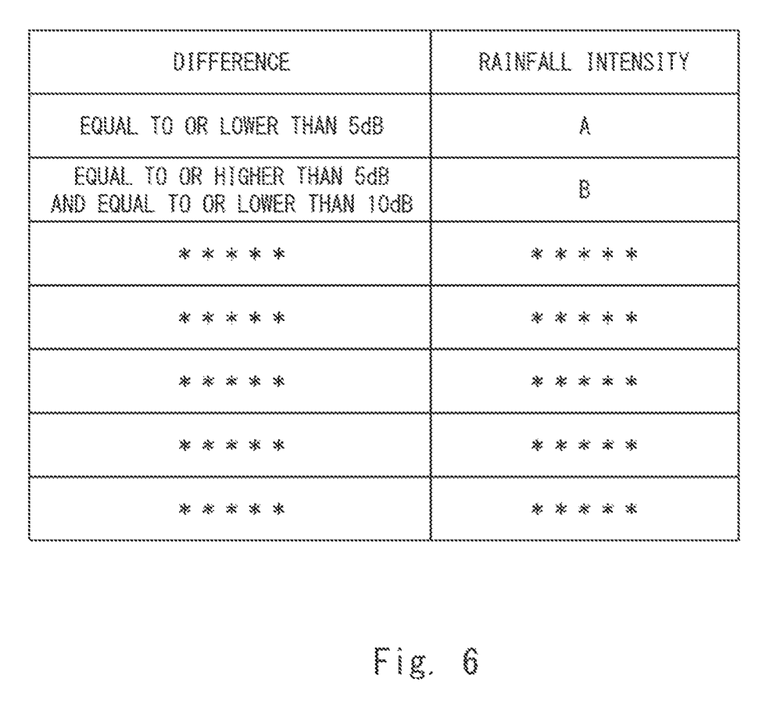
FIG. 6 is an example of a table that is referred to by the estimation unit when estimating the rainfall intensity.

The storage unit 13 also stores in advance a table indicating the rainfall intensity in accordance with the difference (the attenuation) between the reference reception level and the reception level. FIG. 6 shows an example of a table that is referred to by the estimation unit 11 when estimating the rainfall intensity. By referring to the table shown in FIG. 6, the estimation unit 11 estimates the first rainfall intensity from the first attenuation, and estimates the second rainfall intensity from the second attenuation (Step S2). Note that the table shown in FIG. 6 is merely an example, and the storage unit 13 can store a different table for each frequency used.

The, the first rainfall intensity estimated in Step S2 is compared with the second rainfall intensity to determine whether the first rainfall intensity is equal to or smaller than the second rainfall intensity (Step S3). When the first rainfall intensity is equal to the second rainfall intensity or the first rainfall intensity is smaller than the second rainfall intensity in light of the actual transmission status, attenuation due to the rainfall occurs on the antennas 41 and 42 side, and a bandwidth reduction occurs in the first radio section 21. In this case (Step S3, YES), the process proceeds to Step S4.

As described above, it is necessary to match the bandwidth of the whole second radio transmission path 2 with the bandwidth of the first radio section 21 in which the bandwidth reduction occurred. Therefore, in Step S4, the transmission capacity of the first radio section 21 is estimated as the transmission capacity of the second radio transmission path.

On the other hand, when the first rainfall intensity is larger than the second rainfall intensity, the attenuation due to the rainfall occurs on the antennas 41A and 42A side, and bandwidth reduction occurs in the second radio section 22. In this case (Step S3, NO), the process proceeds to Step S5. Here, since it is necessary to match the bandwidth of the whole second radio transmission path 2 with the bandwidth of the second radio transmission section 22 in which the bandwidth reduction occurred, the transmission capacity of the second radio section 22 is estimated to be the radio transmission capacity of the second radio transmission path 2. However, since the bandwidth of the second radio section 22 cannot be grasped as described above, in the example embodiment, the transmission capacity of the second radio section 22 is estimated based on the first rainfall intensity.

Figure 7:
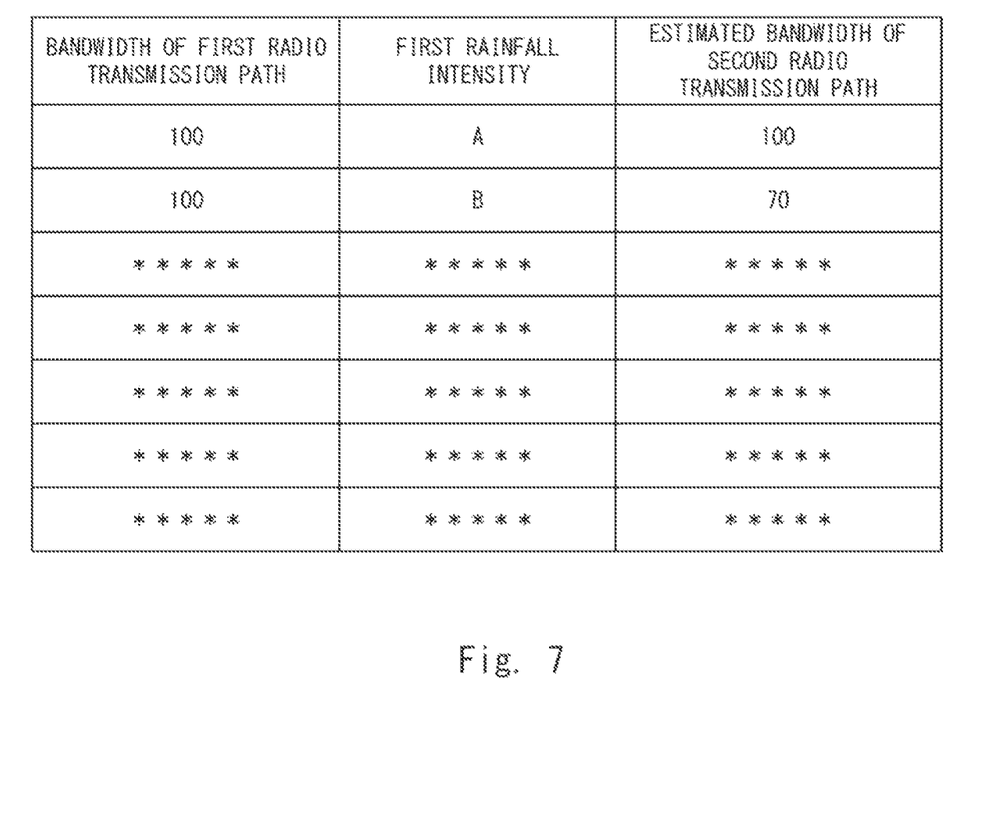
FIG. 7 is an example of a table that is referred to by the estimation unit when estimating the bandwidth information of a second radio transmission path.

In Step S5, the radio transmission capacity of the second radio transmission path 2 (the bandwidth information) is estimated from the first rainfall intensity. Here, the transmission capacity of the second radio section 22 is estimated with reference to a table shown in FIG. 7 which is stored in the storage unit 13 in advance. In the table shown in FIG. 7, the radio transmission capacity of the second radio transmission path 2 corresponding to the first rainfall intensity is shown. By referring to the table shown in FIG. 7, the estimation unit 11 can obtain a bandwidth estimate of the second radio transmission path 2 from the first rainfall intensity.

The method for estimating the radio transmission capacity described above can be used when two or more frequencies are used. The number of radio transmission paths is not particularly limited. However, the reference reception level and the capacity of the storage unit 13 for storing the above-mentioned various tables may be limited.

If the reference reception level and the estimated radio transmission capacity of the radio transmission path deviate from their actual values due to the installation conditions or the like, the offset information can be added separately from the outside. As shown in FIG. 4, the offset information is input to the estimation unit 11. The offset information can be set by any method, such as changing control software or parameters. The estimation unit 11 can change the bandwidth estimate of the second radio transmission path 2 selected from the table shown in FIG. 7 with reference to the offset information.

Next, an operation in which the distribution unit 12 distributes the input data based on the radio transmission capacities (the bandwidth information) of the first radio transmission path 1 and the second radio transmission path 2 will be described. As described above, the division unit 14 divides the input data into lengths that can be efficiently radio transmitted. The distribution unit 12 distributes the divided input data to the first radio transmission path 1 and the second radio transmission path 2 in accordance with the radio transmission capacity of the first radio transmission path 1 and the estimated radio transmission capacity of the second radio transmission path 2.

The radio transmission capacity of the first radio transmission path 1 (the radio bandwidth) is the radio transmission capacity of the radio path 16. On the other hand, the radio transmission capacity of the second radio transmission path 2 (the radio bandwidth) is the smallest value of the transmission capacity of the first radio section 21 and the radio transmission capacity of the second radio section 22. Therefore, the estimation unit 11 acquires the estimated radio bandwidth information of the second radio transmission path 2 and the radio bandwidth information of the first radio section 21, compares these radio bandwidth information, and sets the smallest value thereof as the radio bandwidth of the second radio transmission path 2.

The estimation unit 11 distributes the divided input data in accordance with the acquired radio bandwidth of the first radio transmission path 1 and the radio bandwidth of the second radio transmission path 2 determined as described above. Thus, by using the radio band estimation method of the embodiment, there is no need to superimpose unnecessary information on the data in a link aggregation using a plurality of radio bandwidths having different transmission characteristics, and further, even in a radio relay device having only a simple repeat function, the state of each radio transmission path can be estimated whereby the data packet loss due to bandwidth reduction is eliminated whereby efficient transmission can be realized.

In the aforementioned drawings, each of the constituent components for performing various processing shown in a form of a functional block can have a hardware configuration including a CPU, a memory, and other line. Further, it is possible to implement an arbitrary processing by causing the CPU (Central Processing Unit) execute a program. Therefore, one skilled in the art will understand that these functional blocks can be realized in a form of only a hardware configuration, only a software configuration, or a combination of a hardware configuration and a software configuration, and the configuration is not to be limited thereto.

The program for performing the aforementioned process can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure is not limited to the above-described example embodiments, and can be naturally changed without departing from the gist of the present disclosure. In the aforementioned example, one radio repeater 20 has been disposed in the second radio transmission path 2. The example embodiment may, for instance, be applied to a path in which a plurality of radio repeaters are connected in series.

According to the present disclosure, a communication apparatus, a communication system, a communication method, a communication program capable of appropriately distributing the input data of each radio transmission path when a bandwidth reduction occurs in a radio transmission path can be provided.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A communication apparatus comprising:
    a processor; and
    a memory storing program code executable by the processor to:
    estimate a radio transmission capacity of a second radio transmission path based on a reception level of a radio signal from each of a first radio transmission path and the second radio transmission path, the first and second radio transmission paths connecting the communication apparatus with an opposed communication apparatus that faces the communication apparatus, a radio repeater being inserted into the second radio transmission path, a first part of the second radio transmission path on a side of the communication apparatus serving as a first radio section and a second part of the second radio transmission path on a side of the opposed communication apparatus serving as a second radio section;
    compare estimated radio bandwidth obtained based on the estimated radio transmission capacity of the second radio transmission path with radio bandwidth information of the first radio section, and set a smaller value thereof as a radio bandwidth of the second radio transmission path; and
    distribute data input thereto to the first radio transmission path and to the second radio transmission path based on a radio transmission capacity of the first radio transmission path and the estimated radio transmission capacity of the second radio transmission path, and in accordance with a radio bandwidth of the first radio transmission path and the radio bandwidth of the second radio transmission path.

2. The communication apparatus according to claim 1, wherein the program code is executable by the processor to further store a reference reception level of the first radio transmission path and a reference reception level of the second radio transmission path,
    and wherein the radio transmission capacity of the second radio transmission path is estimated by comparing the reference reception level of the first radio transmission path with the reception level of the radio signal from the first radio transmission path and by comparing the reference reception level of the second radio transmission path with the reception level of the radio signal from the second radio transmission path.

3. The communication apparatus according to claim 2, wherein the radio transmission capacity of the second radio transmission path is estimated by calculating a difference between the reference reception level of the first radio transmission path and the reception level of the radio signal from the first radio transmission path as a first attenuation, by calculating a difference between the reference reception level of the second radio transmission path and the reception level of the radio signal from the second radio transmission path as a second attenuation, and estimating a rainfall intensity using the first and second attenuations.

4. The communication apparatus according to claim 3, wherein the program code is executable by the processor to further:
    estimate a radio transmission capacity of the first radio section as the radio transmission capacity of the second radio transmission path when a first rainfall intensity of the first radio transmission path is equal to a second rainfall intensity of the second radio transmission path or when the first rainfall intensity is smaller than the second rainfall intensity; and
    estimate a transmission capacity of the second radio section as the transmission capacity of the second radio transmission path when the second rainfall intensity is larger than the first rainfall intensity.

5. The communication apparatus according to claim 4, wherein the transmission capacity of the second radio section is estimated based on the first rainfall intensity.

6. A communication method comprising:
    estimating a radio transmission capacity of a second radio transmission path based on a reception level of a radio signal from each of a first radio transmission path and the second radio transmission path, the first and second radio transmission paths connecting the communication apparatus with an opposed communication apparatus that faces the communication apparatus, a radio repeater being inserted into the second radio transmission path, a first part of the second radio transmission path on a side of the communication apparatus serving as a first radio section and a second part of the second radio transmission path on a side of the opposed communication apparatus serving as a second radio section;
    comparing estimated radio bandwidth obtained based on the estimated radio transmission capacity of the second radio transmission path with radio bandwidth information of the first radio section, and set a smaller value thereof as a radio bandwidth of the second radio transmission path; and
    distributing data input thereto to the first radio transmission path and to the second radio transmission path based on a radio transmission capacity of the first radio transmission path and the estimated radio transmission capacity of the second radio transmission path, and in accordance with a radio bandwidth of the first radio transmission path and the radio bandwidth of the second radio transmission path.

7. A non-transitory computer readable medium storing a program for causing a computer to perform processes of:

estimating a radio transmission capacity of a second radio transmission path based on a reception level of a radio signal from each of a first radio transmission path and the second radio transmission path, the first and second radio transmission paths connecting the communication apparatus with an opposed communication apparatus that faces the communication apparatus, a radio repeater being inserted into the second radio transmission path, a first part of the second radio transmission path on a side of the communication apparatus serving as a first radio section and a second part of the second radio transmission path on a side of the opposed communication apparatus serving as a second radio section;

comparing estimated radio bandwidth obtained based on the estimated radio transmission capacity of the second radio transmission path with radio bandwidth information of the first radio section, and set a smaller value thereof as a radio bandwidth of the second radio transmission path; and distributing data input thereto to the first radio transmission path and to the second radio transmission path based on a radio transmission capacity of the first radio transmission path and the estimated radio transmission capacity of the second radio transmission path, and in accordance with a radio bandwidth of the first radio transmission path and the radio bandwidth of the second radio transmission path.

\* \* \* \* \*